L. N. HARTOG.
HEATER FOR AUTOMOBILE RADIATORS.
APPLICATION FILED FEB. 25, 1915.
1,150,268.
Patented Aug. 17, 1915.
2 SHEETS—SHEET 1.
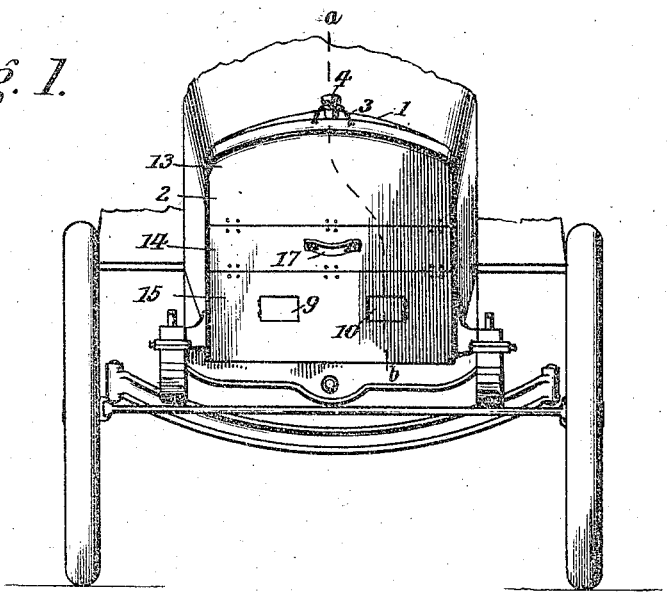
Witnesses
F. M. Rawlings
J. M. Copenhaver
Inventor
L. N. Hartog
By
Herbert J. Jacobi
Attorney

UNITED STATES PATENT OFFICE.

LOUIS N. HARTOG, OF NEW YORK, N. Y.

HEATER FOR AUTOMOBILE-RADIATORS.

1,150,268.
Specification of Letters Patent.
Patented Aug. 17, 1915.

Application filed February 25, 1915. Serial No. 10,622.

*To all whom it may concern:*

Be it known that I, LOUIS N. HARTOG, a citizen of the United States of America, residing at New York, in the county of New York and State of New York, have invented certain new and useful Improvements in Heaters for Automobile-Radiators, of which the following is a specification.

This invention relates to means for preventing the chilling or freezing of the circulating water or other liquid of automobile-engines and other explosion motors which are exposed to extreme changes of temperature, and its object is to connect a heating device into the circulating system, whereby the motor may be kept warm.

A further object of the invention resides in providing a portable member which is applicable at will to the radiator of the automobile to heat the water therein through the pipes to the engine, and a still further object is to provide a casing or the like which entirely covers the front of the radiator when applied thereto, but which is capable of being folded in the shape of a suit case.

A still further object of the invention resides in providing a heating system in connection with the casing, and a still further object resides in providing an oil heating apparatus.

A still further object resides in providing openings in the casing through which light rays from the heating apparatus may be projected, whereby to serve as front lights for the automobile, when the latter is at a standstill, thus saving electricity on the machine.

A still further object resides in providing a device which is simple in construction, inexpensive to manufacture and one which will be very efficient and useful in operation.

With these and other objects in view, my invention consists in the novel features of construction, combination and arrangement of parts as will be hereinafter referred to, and more particularly pointed out in the specification and claims.

Figure 4:
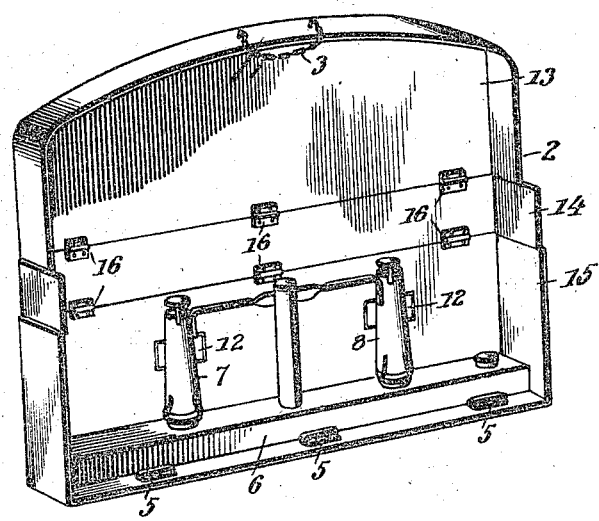
Figure 5:
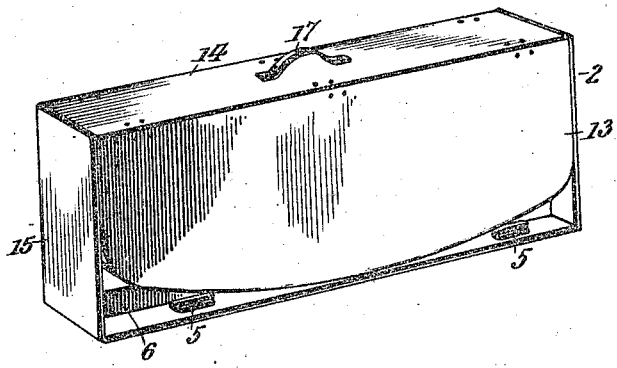

In the accompanying drawings forming a part of this application, Figure 1 is a front elevation of a device constructed in accordance with my invention and applied to use; Fig. 2 is a section therethrough as seen on line *a—b* of Fig. 1, the radiator being shown in full lines; Fig. 3 is a section through the device when removed and folded; Fig. 4 is a perspective view of the heating apparatus removed, viewed from the inside thereof; and Fig. 5 is a similar view of the device in folded position.

In describing the invention I shall refer to the drawings in which similar reference characters designate corresponding parts throughout the several views and in which 1 designates a radiator of an automobile of the usual or any preferred design, from which lead the water circulating pipes to the water jackets of the cylinders of the engine.

Motors of automobiles are hard to start after they have stood out in the cold for some time because the walls of the cylinders become chilled. A common practice is to blanket the hood and radiator to retard the escape of heat, but this only partially mitigates the evil, for in a short time, the liquid in the radiator becomes chilled. As the liquid is usually in constant circulation, the engine too gets very cold, resulting in the lubricating oils getting stiff and also affecting the explosion. As a result, it is often necessary to repeatedly "crank" the engine in order to warm the cylinders by means of the otherwise ineffectual explosions. Some motorists endeavor to overcome this difficulty by placing alcohol in the radiator, but the effects of alcohol on the metal is not good and this means has not proved generally satisfactory, so that some other means must be provided to retain the water in the radiating system at a warm temperature. It is with this in view that I have invented my improved device and in carrying out the idea, I provide a metal casing 2 which is designed to conform to the outline of the radiator, this casing being constructed of a front wall, side edge, top and bottom flanges. As stated, this casing is designed to conform to the outline of the radiator, and the flanges referred to fitting thereover to permit said casing to fit snugly over the radiator, but in order to support this casing in position, a suspension chain 3 is provided at the upper central portion thereof. This suspension chain is looped around the radiator cap 4, and springs 5 are provided at the lower portion of the casing which, when engaged with the lower portion of the radiator, will securely retain this casing in position and prevent casual displacement thereof. As disclosed in the drawings, the bottom flange on the front wall of this casing has an elongated oil tank 6 supported therein, and arranged in connection therewith at predetermined points thereon are the burners 7 and 8. I have shown this form of heating apparatus as the same is the most convenient, but it will be understood that any other heating medium, such as gas or electricity, may be provided if desired. By using oil as a heating medium, such as shown in the drawings, a very inexpensive arrangement is set forth. It will be seen that when this casing is properly applied to the radiator and the burners lighted, heat radiating from the latter will circulate through the radiator and retain the water therein at a warm temperature, also causing the water to circulate through the system and heating the water throughout the pipes and water jackets of the cylinders. This heating apparatus is particularly applicable to automobiles at a stand still, but in very cold periods of the year the same may be allowed to remain on the radiator when the car is in use. The front of this casing 2 is provided at predetermined points therein with a pair of openings 9 and 10, and the same are covered or adapted to be covered by hinged doors or the like 11. The openings proper are covered directly with mica designated as 12, and at nights when the automobile is at a stand still and the heating apparatus is applied, the doors 11 may be opened and the light from the burners reflected through said openings. This will thus serve as front lights for the automobile at such times, and the electricity on the same will thus be saved.

As stated in the objects, this device is portable and adapted to be folded, and in carrying out this end, the front wall of the casing is formed in three sections designated in the drawings as 13, 14 and 15. These sections are hinged one to the other as indicated at 16, and the intermediate section 14 is a narrower section so that the section 13 may be folded readily against the section 15 to form substantially a rectangular casing. The outer wall of the intermediate section 14 has a handle member 17 thereon so that when the device is folded, as shown in Fig. 5, of the drawings, a device in the form of a traveling case or the like is presented. As thus folded this device may be conveniently placed in the machine and carried about at all times, to be used at the will of the operator.

From the foregoing description of the construction of my improved device, the manner of applying the same to use and the operation thereof will be readily understood and it will be seen that I have provided, a simple, inexpensive and efficient means for carrying out the objects of the invention.

While I have particularly described the elements best adapted to perform the functions set forth, it is obvious that various changes in the form, proportion and in the minor details of construction may be resorted to, within the scope of the appended claims, without departing from the spirit or sacrificing any of the principles of the invention.

Having thus described my invention, what I claim and desire to secure by Letters Patent, is:—

1. A device of the class described, comprising a casing designed to conform to the outline of an automobile radiator and applicable thereto, said casing being constructed of a trio of hinged together folding sections, a handle member secured to the outer face of the intermediate section to conveniently carry said casing when folded, a heating medium arranged in the lower section of the casing, and means for removably supporting said casing on a radiator, as aforesaid.

2. A device of the class described, comprising a casing designed to conform to the outline of an automobile radiator and consisting of a front wall and lateral edge flanges to engage the faces of the aforesaid radiator, a flexible connection carried by the top flange of the casing for engagement with a radiator cap, leaf spring members carried on the inner face of the bottom flange for engagement with the under face of the radiator, whereby to grip the casing in position on the latter and a heating medium arranged in said casing.

3. A device of the class described, comprising a casing designed to conform to the outline of an automobile radiator and consisting of a front wall and lateral edge flanges said front wall being formed in sections hinged one to the other and foldable, a flexible connection carried by the top flange of the casing and adapted for engagement with a radiator cap to suspend the casing in position, leaf spring members carried on the inner face of the bottom flange for engagement with the under face of the radiator to grip the casing in position thereon, and a heating medium arranged in said casing.

4. A device of the class described comprising a casing designed to cover the front of an automobile radiator, a heating medium arranged in said casing, a flexible connection carried by the upper portion of the casing to engage a portion of the radiator and suspend the casing therefrom, and a yielding means at the lower portion of the casing to engage the lower portion of the radiator and grip the casing thereto.

In testimony whereof I affix my signature in presence of two witnesses.

LOUIS N. HARTOG.

Witnesses:
 THOS. HARRINGTON,
 NICHOLAS SINNOTT.